P. P. DEAN.
RECORDING DEVICE FOR SIGNAL SYSTEMS.
APPLICATION FILED JUNE 30, 1916.
1,400,270.
Patented Dec. 13, 1921.
3 SHEETS—SHEET 1.
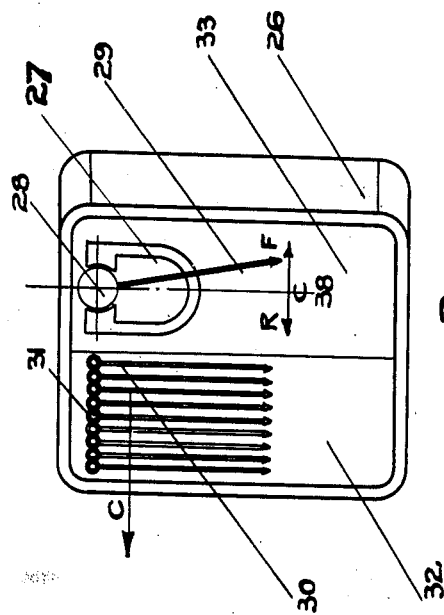
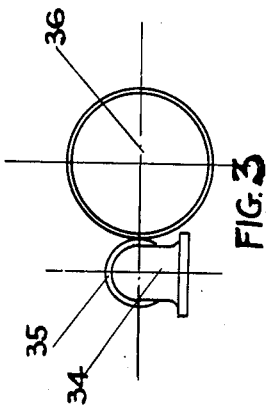
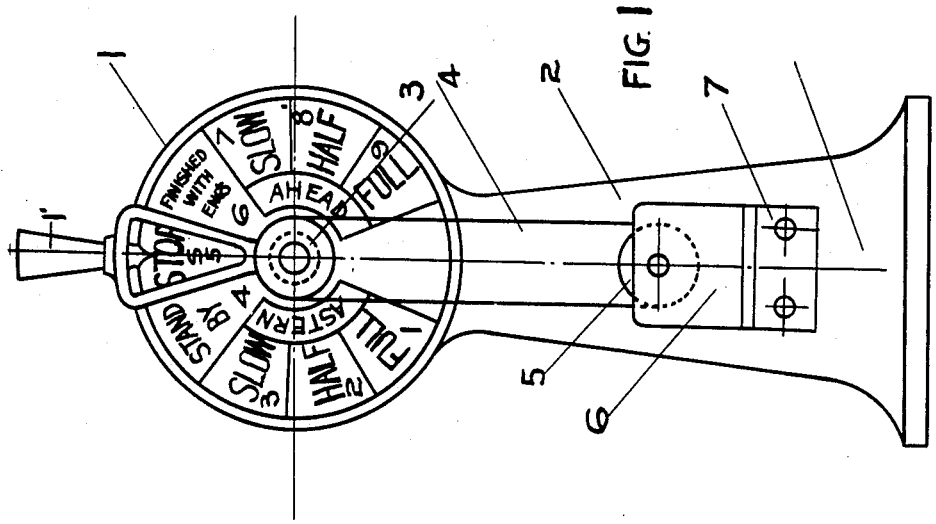
WITNESS
INVENTOR
Peter Payne Dean
BY
Arthur Phelps Marr
ATTORNEY

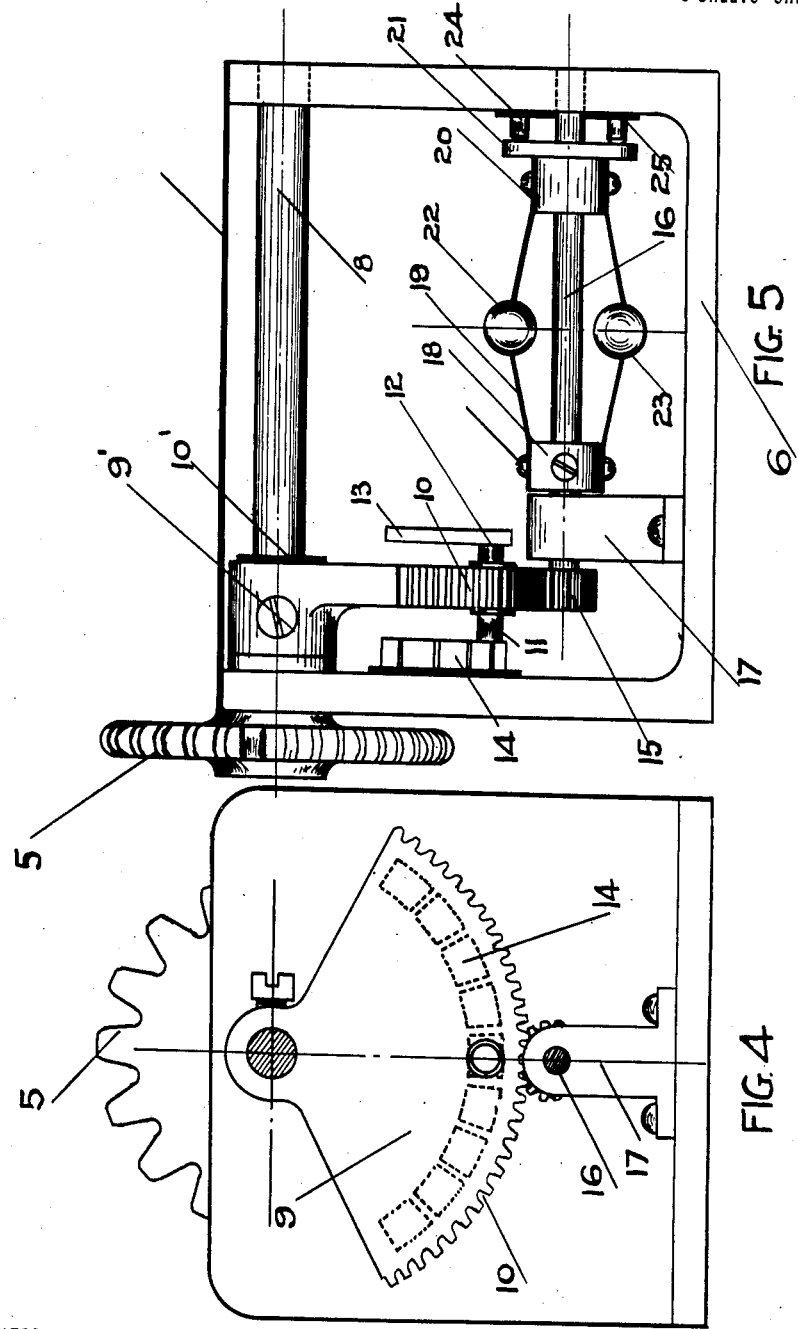

P. P. DEAN.
RECORDING DEVICE FOR SIGNAL SYSTEMS.
APPLICATION FILED JUNE 30, 1916.

1,400,270.

Patented Dec. 13, 1921.
3 SHEETS—SHEET 3.

WITNESS

INVENTOR
Peter Payne Dean
BY
ATTORNEY

UNITED STATES PATENT OFFICE.

PETER PAYNE DEAN, OF NEW YORK, N. Y.

RECORDING DEVICE FOR SIGNAL SYSTEMS.

1,400,270.  Specification of Letters Patent.  Patented Dec. 13, 1921.

Application filed June 30, 1916. Serial No. 106,779.

*To all whom it may concern:*

Be it known that I, PETER PAYNE DEAN, a subject of the King of England, and resident of the borough of Manhattan, city, county, and State of New York, have invented certain new and useful Improvements in Recording Devices for Signal Systems, of which the following is a specification.

The device, the subject of this invention, is especially intended as a means for assisting in the operation of steamships, steamboats or mechanically propelled water craft, and has for its principal objects the provision of recording apparatus which will not only record the signal transmitted by the ship's telegraph, but will also record the action of the engine which results because of the signal that has been transmitted.

It has often occurred that where a multiplicity of signals have been transmitted in rapid succession from the bridge to the engine room the engineer or operator has not responded in the order in which the signals were transmitted with the results that accidents have occurred which have resulted in loss of life and destruction of property.

When an accident occurs difficulty is experienced in placing the responsibility because of the fact that confusion of signals might result from a rapid transmission and also it has been found that when a definite space of time does not elapse between signals, the mind of the operator is not influenced to a sufficient extent to cause the desired response.

After an accident under ordinary conditions, it becomes a question as to just what signals were given and what signals were responded to. In my device such a question could not arise as each signal is recorded upon a suitable chart that has taken place as the result of the signal.

The construction and operation of my device will be fully set forth as the specification progresses.

The following is what I consider the best means of carrying out this invention in which:

Figure 1 shows a ship's telegraph to which the operating portion of my device is attached.

Fig. 2 is a diagrammatic view of the recording time and speed indicators.

Fig. 3 is a diagram of an engine shaft and magneto operated thereby.

Fig. 4 shows an elevation of the device which is attached to the sending device of the ship's telegraph.

Fig. 5 is a side elevation of the device shown in Fig. 4.

Figure 7:
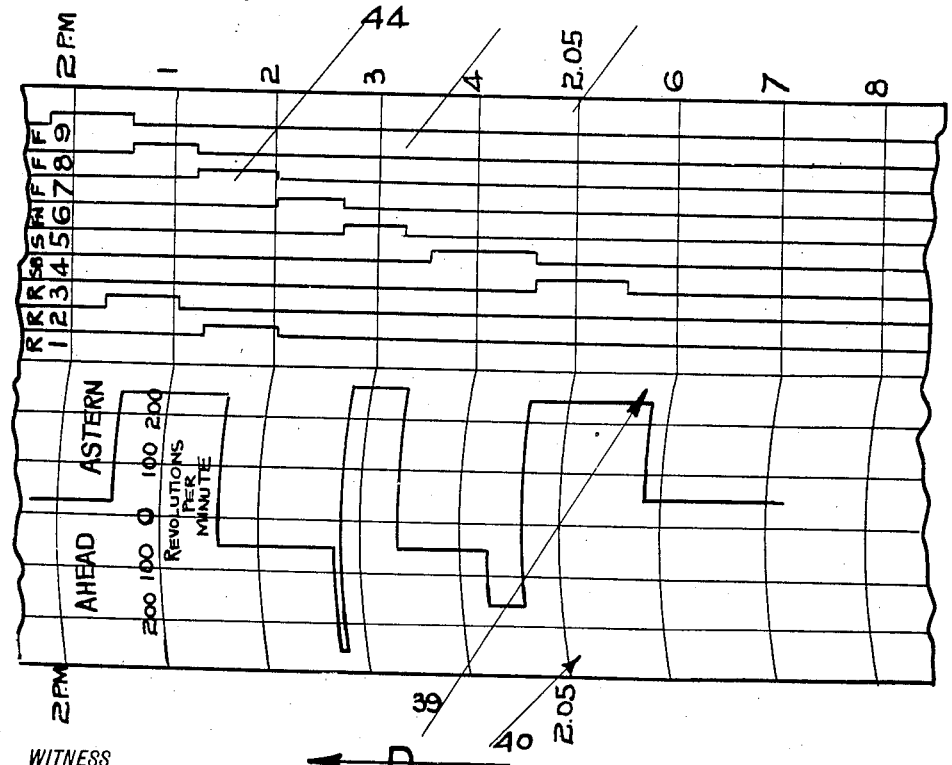

Fig. 7 a small portion of a chart upon which the several indications are recorded.

Similar reference numerals indicate like parts in all the figures where they appear.

In Fig. 1, I show in front elevation the sending device of a ship's telegraph. This device is of an ordinary construction except for the additions that I have made which will be described as the specification progresses.

The sending devices or signaling pedestal as they are generally termed are arranged one in the pilot house and usually one or more on the bridge and it is often convenient to arrange other similar devices at different parts of the ship to be used in docking or in running under extraordinary conditions.

This sending device consists of the dial 1 which is supported upon a pedestal 2. The dial has a face of glass sub-divided as shown across which an operating handle 1' may be passed. Under ordinary conditions the handle is moved in either direction, to the right when the boat is to be operated ahead and to the left when the reverse operation or a movement astern is desired. The operation of the handle to any position introduces into a convenient circuit a lamp which will illuminate that portion of the dial at which the handle is brought to rest and as a similar dial is provided in the engine room, and as the lamps of both dials are in series, when the lamp illuminates the sending or bridge dial, the engine room dial will be similarly illuminated and here I desire to call attention to the fact that in the ordinary construction the movement of the handle from the center to the full movement in either direction will cause a momentary illumination of each and every one of the lamps behind that portion of the dial over which the handle has passed. This momentary illumination is exceedingly confusing. I call attention to the ordinary construction so that my improvements may be more readily appreciated and understood.

Upon the shaft which supports and which is operated by the handle 1' I secure a pulley or sprocket 3 and over this pulley or sprocket I pass a belt or chain 4.

In approximate alinement with the sprocket 3 I arrange another pulley or sprocket 5 which is supported upon a suitable shaft 8 arranged in the casing 6 and the casing is secured by means of bolts or rivets 7 to the exterior of the pedestal 2.

And now, referring to Figs. 4 and 5 I will describe in detail the construction of the mechanism which is arranged within the casing 6.

This device is a contact maker. The sprocket 5 is secured to and rotates the shaft 8 and upon this shaft I also secure a sector 9 which is provided with a plurality of teeth 10 and it should be noted that the sector is insulated from the shaft 8 by means of a bushing 10'.

Arranged in the sector and movable therewith is a plug 11 insulated from the sector by means of the bushing 12. This plug is in contact with a metallic strip 13 to which a line lead from a suitable source of current supply may be secured and the opposite end of the plug 11 contacts with a commutator which consists of a plurality of independent strips of copper or other suitable metal as shown at 14. As the plug 11 is caused to pass along the strip 13 and across the commutator a circuit will be completed, but it is to be desired that no indication of the movement of the sector shall be made or recorded except such movements as are to be considered as signaling movements. I have therefore provided a means whereby the circuit will be interrupted during the movement of the sector and will be only reëstablished when the sector is brought to rest in the desirable position, this means comprising a pinion 15 which is rotated from the sector 9 and the relation between the sector and pinion is such as to cause a rapid revolution of the pinion during the movement of the sector.

The pinion 15 is secured to a shaft 16 which shaft is mounted between a bearing block 17 and one side of the casing 6, and upon the shaft 16 I secure a collar 18 which supports one end of flexible members 19. The other end of these flexible members is secured to a movable collar 20 attached to which is a disk 21 and a plurality of weights 22 and 23 arranged upon the flexible member complete the governor which shortens the distance between the collars 18 and 20 when the shaft 16 is rotated. Supported by the casing 6 but insulated therefrom is a plurality of contact points 24 and 25. These points which are in line with the disk 21 may be connected into a source of current supply and the disk 21 bridges the gap between the points 24 and 25 completing the circuit therethrough.

In Fig. 2 I show a casing 26, in which is mounted an indicating device consisting of a magnet 27 and an armature 28. Secured to the armature 28, which will terminate in a pen point, is a pointer.

In the other half of the casing 26, I show a plurality of pointers 30 each pivoted as indicated at 31, and each of the pointers 30 should terminate in a pen point. Under the series of pen points or pointers 29 and 30 and in the spaces indicated at 32 and 33 I pass a chart or long strip of paper subdivided in a manner to be later described and each operation of any of the pointers will be indicated upon the paper strip or chart. The pointers indicated at 30 are each connected with one of the commutator bars 14 and cause a record to be made upon the chart of each effective movement of the sector 9. The pointer 29 operated by the armature 28 and magnet 27 is controlled and is caused to move by a magneto 34 driven by a friction wheel 35 from the engine or propeller shaft 36.

Figure 6:
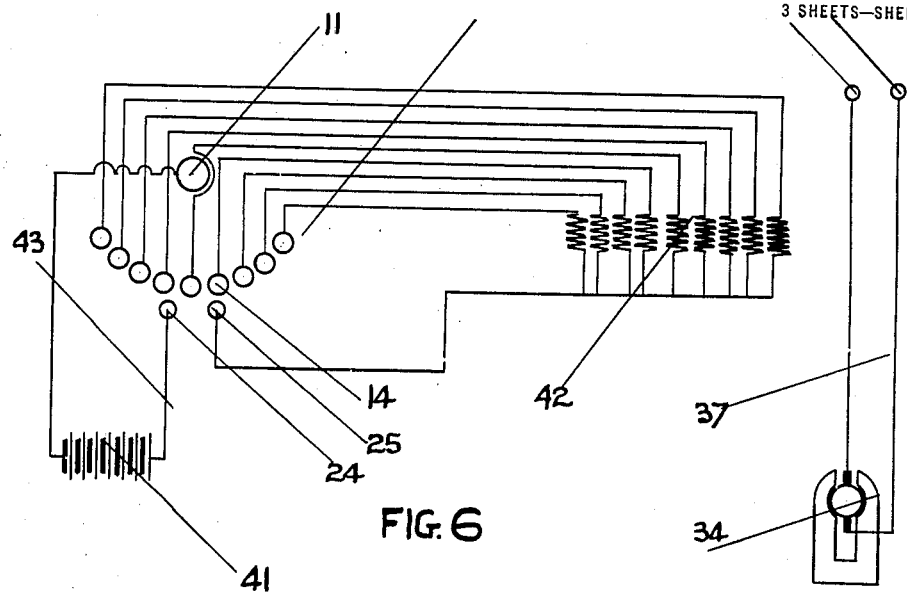
Fig. 6 shows the wiring diagram.

Now I will describe the method of operation of my device and in doing so I will refer to the diagram shown in Fig. 6 and the chart shown at Fig. 7, and upon this diagram and chart I will place reference characters corresponding to the characters used upon the figures which show the mechanical construction of the parts referred to.

The magneto which is driven from the engine or propeller shaft is indicated at 34 in Fig. 6 and the leads or wires which are connected therewith terminate at the armature 28 of the larger recording device shown in the casing 26. When the shaft 36 is at rest no current will be generated by the magneto 34 and therefore the pen or pointer 29 will remain stationary upon the center line 38. When however the engines are causing the shaft 36 to rotate the pen 29 will be deflected in the direction of the arrow F if the engine is running ahead, or in the direction of the arrow R, when the engines are reversed. This movement of the pen will cause it to inscribe a deflected line on the chart shown in Fig. 7, the deflection being in the direction of and toward the point 39 during the reverse movement of the engine and in the direction of and toward the point 40 during a forward movement of the engine, and it will be observed that the chart is sub-divided by a number of longitudinal lines and that these lines are indicated at zero 100, and 200, and these figures indicate the speed at which the shaft 36 is revolving.

It will be noted that the other half of the chart is also sub-divided although the longitudinal lines of sub-division here shown are produced by the pens 30. These lines or the spaces in which the lines are produced are indicated in a manner to exactly correspond with the indications in the several sub-divisions of the dial 1.

In Fig. 6 a battery or source of electrical supply is shown at 41, a lead from the battery is carried to the contact 24 and from the contact 25 a suitable wire is carried to the coils 42, these coils which are arranged within the casing 26 are the magnet coils for the several pointers 30 and all may have one side connected to the lead from the contact 25. The opposite side of each armature coil 42 is connected to a commutator bar 14 and the other side of the battery is connected through a suitable lead wire 43 to the plug 11.

When the handle 1' is in the position shown in Fig. 1, the plug 11 is in contact with the centermost commutator member 14 and if at this time the disk 21 has closed the circuit through the contacts 24 and 25 this section of the dial 1 will be illuminated. At any rate the several pens 30 will draw straight lines on the upper portion of the chart. Now when a movement of the handle to the right takes place the disk 21 will be withdrawn until the handle 1' is brought to rest at which time the portion of the dial over which the handle is allowed to rest will be illuminated and at the same time the pen which is connected or energized by the passage of current through its magnet will be deflected with the result that the line which it is producing will be distorted as indicated at 44. This distortion will continue until the movement of the handle 1' deënergizes the armature of this pointer, when the pointer will return to the normal position to produce a straight line.

In the chart I have shown a distortion of each of the pens in turn and I have also shown the result of the several movements as each of the lines drawn by the pens is broken or distorted. It will be understood that the movement of each pen 30 is occasioned by the movement of the handle 1' which causes an operation of the sector 9 and the plug 11 carried thereby, and that the pen 29 is entirely under the influence of the magneto 34 which is driven from the shaft 36.

I desire to call particular attention to the chart shown in Fig. 7 and to the transverse line thereon which lines indicate spaces of time as shown by the figures arranged along the upper end of the chart. A suitable clock work or timing mechanism should be provided for moving the chart and the deflections of the lines $R^1$ to $F^9$ will indicate the length of time that the handle 1' was retained in any position.

The deflections in the speed lines, the line on the other portion of the chart will indicate not only the direction and speed of rotation of the engine or propeller shaft but also any changes in direction and for how long a time each direction was maintained, and at the exact time that the change occurred. This is exceedingly important as it proves conclusively whether or not a signal was responded to and at just what time the response took place, and will also indicate the time which elapses between the sending of the signal and the response thereto, the whole being contained upon a record, chart or sheet that may be retained for future reference or information.

It is quite obvious that modification may be made in the construction and that changes in the mechanical arrangement or location of the parts to adapt the device to operate under differing conditions may be made within the scope of the appended claims without departing from the principle or sacrificing the advantages of this invention.

The Figs. 1, 2, 3, 4 and so forth, along the upper edge of the chart shown in Fig. 7, indicate the time as sub-divided into minutes. I may shorten the space so that the sub-division will indicate five minutes or a greater period of time, or I may lengthen the space so that signals may be read when such changes are made. It will of course be necessary to increase or decrease the speed of the clock work not shown by means of which the chart is moved.

I may connect the illuminating means for the dials with the device shown in Fig. 5, so that the current will pass through the lamps only when the handle 1' is at rest, or I may use such a device in communication with illuminated dials with the obvious advantage that only that portion of the dials which indicate the signals to be transmitted will be illuminated even during the movement of the handle.

Having carefully and fully described my invention what I claim and desire to secure by Letters Patent is:—

1. In a chronographic mechanism for machinery, in combination, a single chronographic chart, separate marking instrumentalities to respectively record on said chart exigencies of control and actual control, the latter of said instrumentalities comprising an oscillatable marker and electromagnetic control means for said oscillatable marker to cause the same to assume an angular position variable with the actual control of the machine.

2. In a chronographic mechanism for machinery, in combination, a chronographic chart, a plurality of markers therefor, normally in engagement with said chart to inscribe thereon continuous lines extending longitudinally thereof and means for deflecting said devices and insuring deflection thereof selectively for the purpose set forth.

3. In a chronographic mechanism for machines, in combination, a chronographic chart, a plurality of markers therefor, separate electromagnets for controlling said markers, a device movable to energize said electromagnets successively and means insuring against response of said electromagnets until said device is arrested for the purpose set forth.

Signed at New York city, in the county and State of New York, this 27th day of June, 1915.

PETER PAYNE DEAN.

Witness:
G. E. S. MARR.